H. N. CARRAGHER.
DEMOUNTABLE RIM FOR VEHICLE WHEELS.
APPLICATION FILED MAY 24, 1915.

1,171,503.

Patented Feb. 15, 1916.
3 SHEETS—SHEET 1.

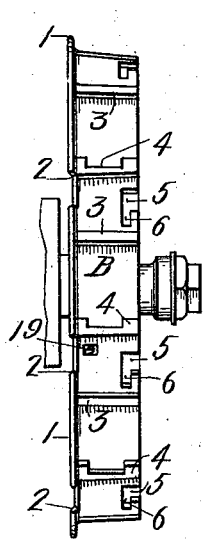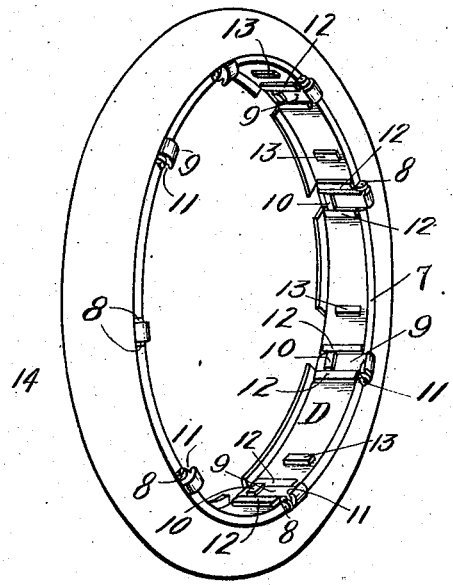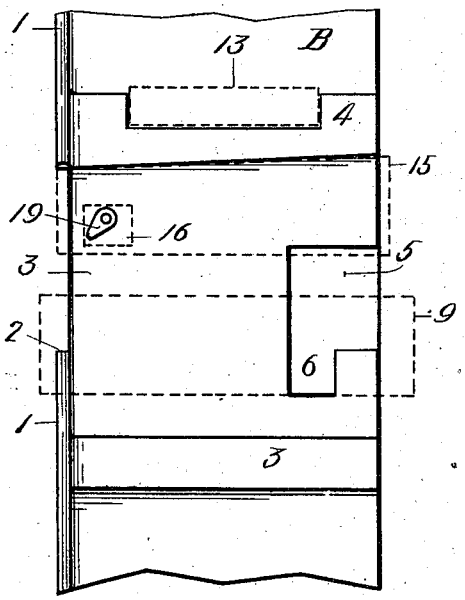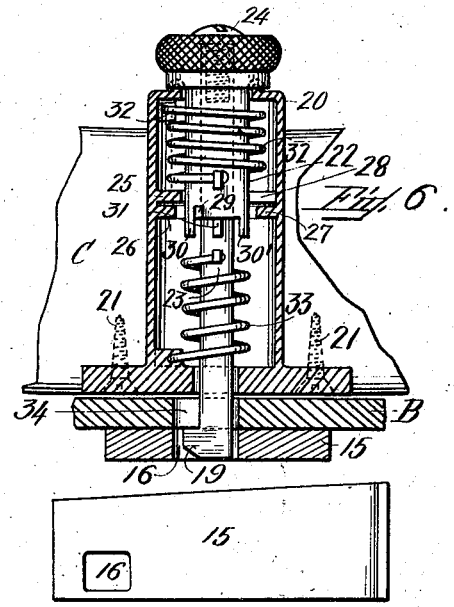

H. N. CARRAGHER.
DEMOUNTABLE RIM FOR VEHICLE WHEELS.
APPLICATION FILED MAY 24, 1915.

1,171,503.

Patented Feb. 15, 1916.
3 SHEETS—SHEET 3.

Witnesses
B. M. Shedd
H. E. Rennick

Inventor
Henry N. Carragher
by his attorney
Charles F. Richardson

UNITED STATES PATENT OFFICE.

HENRY N. CARRAGHER, OF FALL RIVER, MASSACHUSETTS.

DEMOUNTABLE RIM FOR VEHICLE-WHEELS.

1,171,503. Specification of Letters Patent. Patented Feb. 15, 1916.

Application filed May 24, 1915. Serial No. 29,982.

*To all whom it may concern:*

Be it known that I, HENRY N. CARRAGHER, a citizen of the United States, residing at Fall River, in the county of Bristol and State of Massachusetts, have invented certain new and useful Improvements in Demountable Rims for Vehicle-Wheels, of which the following is a specification, reference being had therein to the accompanying drawing.

My invention relates to means for removably securing a demountable rim to a felly band of a vehicle wheel; one of the principal features residing in apparatus for quickly and easily locking together, and taking up, to prevent rattling, the wear of the coöperating metallic parts of the rim and felly band.

Figure 1:
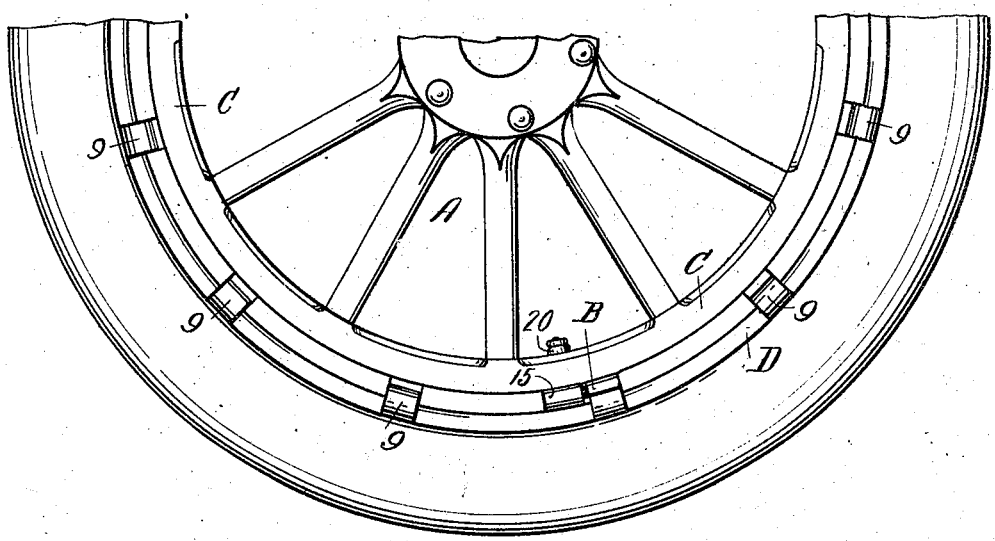
Figure 2:
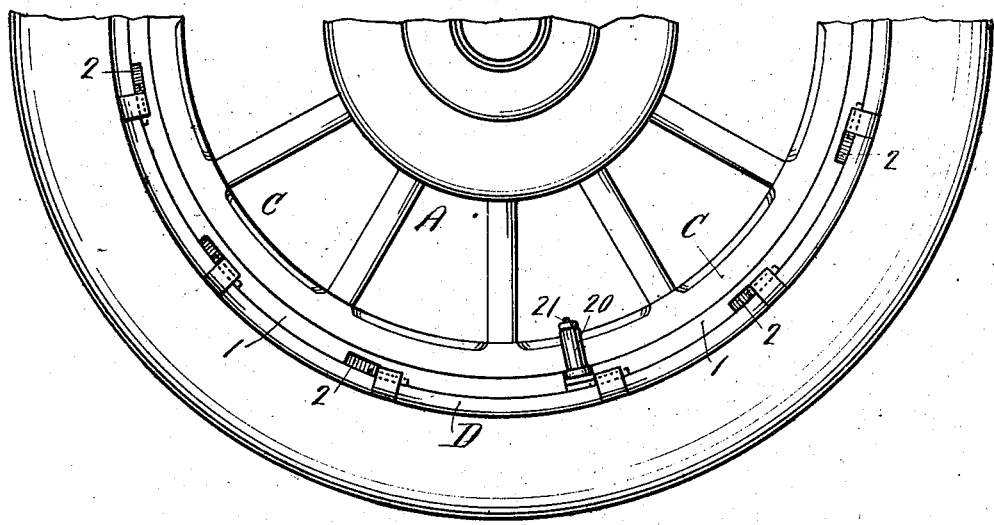
Figure 8:
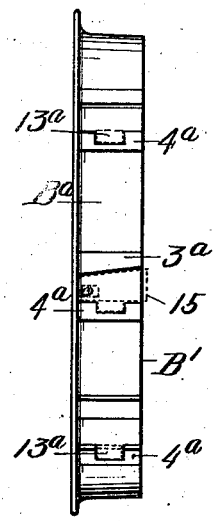
Figure 9:
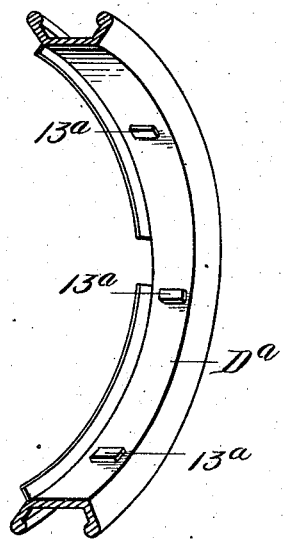
Figure 10:
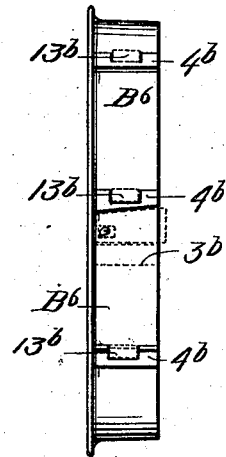
Figure 11:
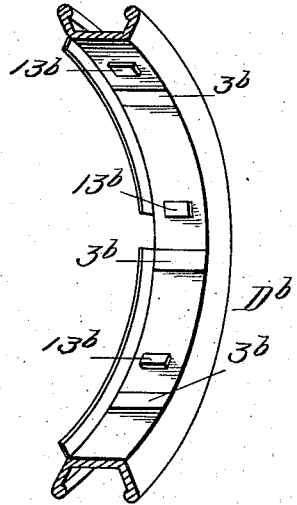

In the drawings illustrating the principle of my invention and the best mode now known to me, of embodying the same in an operative structure, Figure 1 is an elevation of the outside lower portion of a wheel provided with my invention. Fig. 2 is a like view of the inside of the wheel. Fig. 3 shows a front view of the felly band, in perspective, the demountable rim having been removed. Fig. 4 is a perspective view of the inside of the demountable rim, showing the parts in proper position, to be moved into engagement with the felly band shown in Fig. 3. Fig. 5 is an enlarged detail of the felly band and take-up device in full lines; and a locking key, and the coöperating parts of the demountable rim, indicated by dotted lines. Fig. 6 illustrates in enlarged detail and sectional elevation, the locking key and the takeup or rattle preventing device. Fig. 7 is a plan of the locking key. Figs. 8 and 9 are perspective views respectively, of a felly band, and a demountable rim of the clencher type; the positions of the key and the male lock lugs of the rim being indicated by dotted lines. Figs. 10 and 11 are like views of such a band and rim, the coöperating parts being slightly different, however, from those shown in Figs. 8 and 9.

The pneumatic wheel A, Figs. 1 and 2, has a metallic felly band B on its wooden felly C, and a demountable rim D. The inner edge of the felly band flares outwardly and forms a circumferential lock flange or rib 1. Figs. 3 and 5, which has cut in it a series of transverse inner clamp openings 2; while from the rib, at right angles thereto, extending toward the outside edge of the band, is formed integrally with the band, at suitable distances apart, a series of lugs, made up alternately of a lug 3 with substantially parallel sides, and another lug 4, E-shaped, the middle stem being removed, and hereinafter called the female lug. Formed in the outside edge portion of the felly band B extending beyond the wood of the wheel and opposite the clamp slots in the rib, are arranged outside clamp openings 5 which lead into lock slots 6 lying in the plane of the felly band.

The demountable rim D, Fig. 4, with a single tire holding flange 7 has, pivoted or hinged in suitable ears 8 upon the outside of the tire-holding flange, a series of clamps 9; the free end of each clamp passing over and securing a removable metallic retaining ring, not shown, opposite the tire-holding flange, for keeping the pneumatic shoe in position upon the demountable rim. Integral with each clamp, upon its upper surface, is an upright lug 10 to register with the outside clamp openings 5, Figs. 3 and 5, adapted to engage the lock slots 6 in the outside of the felly band; while in the other end portion of the clamp is made a channel 11 equal in breadth and depth to the dimensions of the lock flange or rib 1, to be engaged and retained by the lock flange of the felly band to transversely lock the rim D to the metallic felly band B of the wheel. Each clamp 9 lies between parallel abutments 12, while between each pair of clamps and parallel therewith, is a male lock lug 13 centrally disposed around the inner circumference of the demountable rim, to engage with its respective female lug 4, Fig. 3, upon the felly band B.

From what has been described it is evident that the demountable rim with its inflated shoe 14 may be mounted upon the felly, by being pushed axially on to the felly band B, Figs. 3 and 5, of the wheel; the upright lock lugs 10 on the clamps 9, the rear pivoted portions of the clamps, and the male lugs 13 on the inside circumference of the demountable rim, each passing through their respective openings in the metallic felly band, and by a rearward movement of the rim with relation to the felly, are brought into engagement with their transverse locking slots 6, locking ribs 1, and female lugs 14. But to hold rigidly the coöperating parts in this position, further apparatus is required.

A steel wedge or key 15, Figs. 4, 5, 6, 7, with an opening 16, Fig. 7 in its exposed face, one side of which is a cam surface, is designed to be wedged between the plane face of the female lug 4 on the felly band and the adjacent side of the abutment 3 of the next clamp, where the key 15 is held by the constant pressure of a cam 19 forming part of the following described structure.

A lock case 20, Fig. 6, is secured to or in the wooden felly C of the wheel, as by screws 21. It is preferably cylindrical, and has longitudinally mounted therein a sleeve 22 and lock pin 23, the latter is in a radial plane of the wheel and has its free end portion extend to the bottom of the case, while the opposite end is, by means of a screw 24 movably supported in the finger operated sleeve 22. A support 25 forms a part of the interior of the lock case, and surrounds the sleeve, while directly beneath the support and diametrically opposite are two abutments 26, 27; there being a vertical opening 28 above, but at one side of the abutment 27, through which a shoulder 29 upon the sleeve 22 may be drawn up, when the sleeve is lifted, and the shoulder 29 is in contact with the abutment 27, so that it may, when rotated, rest upon the top of the support 25. Confined with a limited movement between two depending members 30, 30' of the sleeve, is a shoulder 31 on the side of the lock pin, and so positioned that when the shoulder 29 of the sleeve 22 is resting upon the support 25, the sleeve, by reason of the tension on the spring 32 fixed to it and to the case, cannot move rotatably more than a predetermined distance because of the engagement of the shoulder 31 on the pin with the abutments 26, 27; and further, when the sleeve and pin are in the position where the shoulder 29 on the sleeve, is below the support 25, that is the locking position, the abutment 26 limits the movement of the shoulder and hence the sleeve, while the depending members 29, 30 limit the rotary movements of the shoulder 31 and hence the locking pin, due to the tension of the spring 33 fixed to it and to the locking case.

The bottom end portion of the lock pin is provided with a cam 19 to operate in a plane at right angles to the longitudinal axis of the pin. It is of such thickness and size that when not in operation it may lie entirely within the felly, but when in operation, it lies outside of the felly to engage the cam surface of the key.

In Fig. 6, the cam is assumed to be in locking engagement with the cam surface of the key 15, see also Fig. 5; the spring 33 constantly pressing the pin and cam in a direction to move the key into closer engagement between the female lug 4 and the side of the abutment 3 of the clamp, so that there can never be looseness of engagement between the coöperating parts.

To remove the key, the sleeve 22 is turned backward against the opposition of the spring 32, until it comes to a stop by the contacting of the shoulder 29 with the abutment 27; the sleeve is then lifted, the shoulder 29 coming up through the hole 28 in the support 25, and released. In doing this, the cam 19 is moved out of engagement with the cam surface of the key, and up out of the key into the cavity 34 therefor in the felly; but when the sleeve is released as above, the shoulder 29 is moved by the spring 32 along the top surface of the support 25, and hence the cam remains in its cavity in the felly. The key 15 may now be withdrawn, the demountable rim D moved circumferentially ahead in relation to the felly, and then outward, axially, until it is free.

If it be assumed that the rim D has been returned to locking position on the felly, then to lock securely the parts together, the key 15 is inserted, the sleeve 22 of the lock device moved back over the hole 28, the shoulder 29 pushed down through the hole, the cam 19 entering the cavity 16 in the key. The sleeve is next finally released, and both springs 32, 33 acting together, that 32 of the sleeve through the shoulder 31 and depending member 30'; and that 33 of the pin, directly on the pin; cause the cam 19 at once to begin to exert pressure to draw the key 15 into closer engagement with its abutting members.

That my invention may be applied to other demountable rims, say of the clencher type, becomes evident upon an inspection of Figs. 8 to 11 inclusive. The felly band B' of the wheel, as before pointed out, has the key 15 and spring cam-locking mechanism; the shoulders for the key to engage, being in the structure shown in Figs. 8 and 9, an abutment 3$^a$ on the felly band and a male lug 13$^a$ on the demountable rim D$^a$ which engages a female lug 4$^a$ also on the felly band; and in the structure depicted in Figs. 10 and 11, a female lug 4$^b$ on the felly band, and a lug 3$^b$ on the demountable rim. In the latter structure, the male lugs 13$^b$ on the demountable rim engage the female lugs 4$^b$ on the felly band B$^b$.

By means of my invention, I do away with the need of nuts and bolts heretofore used in connection with wedges, hence the time consumed in removing and replacing them; the bolts wearing loose, the stripping of their threads, and the rattle of loose coöperating parts.

Desiring to protect my invention in the broadest manner legally possible, what I claim is:

1. In a wheel having a felly band, a demountable rim, and means for securing them in the same plane, and limiting the movement of one in relation to the other, in one direction circumferentially:—a shoulder upon the inside of the rim, a shoulder upon the outside of the band; a removable wedge-shaped key mounted tangentially and inserted transversely between said shoulders; a cam surface formed in said key; a cam to engage said surface and operating in a plane at right angles to the radius of the wheel; a spring tending to move said cam, and, through said cam surface, said key transversely between said shoulders; manual means to move said cam rotatively about, and longitudinally in, the radius of the wheel, for the purpose of raising the cam out of spring engagement with the key to permit the removal of the key and unlock the rim from the band; means to hold the cam in locking position; means to hold said cam in unlocked position.

2. In a wheel having a felly band, a demountable rim, and means for securing them in the same plane, and limiting the movement of one in relation to the other, in one direction circumferentially:—a shoulder upon the inside of the rim, a shoulder upon the outside of the band; a removable wedge-shaped key mounted tangentially and inserted transversely between said shoulders; said key having an opening therethrough with a cam surface toward the advancing end of the key; a manually operated stem supported in suitable means secured to the felly band of the wheel, and capable of limited longitudinal, and rotary movements in and about the radius of the wheel; a cam fixed to the lower end of said stem, and of suitable size to be moved into and out of engagement with said cam surface in said cam opening; spring means tending to hold the cam in said rotary engagement; means to hold said stem and cam in a fixed longitudinal position, either locked or unlocked; and a spring always tending to move said cam toward or against said cam surface; and means to limit, forward and back, the rotary movement of said stem and cam.

3. In a wheel having a felly band, a demountable rim, and means for securing them in the same plane, and limiting the movement of one in relation to the other, in one direction circumferentially: a shoulder upon the inside of the rim, a shoulder upon the outside of the band; a removable wedge-shaped key mounted tangentially and inserted transversely between said shoulders; and means operating in a plane at right angles to the radius of the wheel, and constantly tending to move said key transversely between said shoulders.

4. In a wheel having a felly band, a demountable rim, and means for securing them in the same plane, and limiting the movement of one in relation to the other, in one direction circumferentially: a shoulder upon the inside of the rim, a shoulder upon the outside of the band; a removable wedge-shaped key mounted tangentially and inserted transversely between said shoulders; means operating in a plane at right angles to the radius of the wheel, and constantly tending to move said key transversely between said shoulders; manual means to move said cam rotatively about, and longitudinally in, the radius of the wheel, for the purpose of raising the cam out of spring engagement with the key to permit the removal of the key and unlock the rim from the band; means to hold the cam in locking position; and means to hold said cam in unlocked position.

In testimony whereof I hereunto affix my signature in the presence of two witnesses.

HENRY N. CARRAGHER.

Witnesses:
WILLIAM S. GREENE,
WILLIAM W. BEVERLY.